United States Patent
Magi Shaashua et al.

(10) Patent No.: US 9,509,688 B1
(45) Date of Patent: Nov. 29, 2016

(54) PROVIDING MALICIOUS IDENTITY PROFILES FROM FAILED AUTHENTICATION ATTEMPTS INVOLVING BIOMETRICS

(71) Applicant: EMC Corporation, Hopkinton, MA (US)

(72) Inventors: Triinu Magi Shaashua, Herzeliya (IL); Alon Kaufman, Bnei-Dror (IL); Yael Villa, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 494 days.

(21) Appl. No.: 13/801,103

(22) Filed: Mar. 13, 2013

(51) Int. Cl.
    *H04L 29/06* (2006.01)
(52) U.S. Cl.
    CPC .................... *H04L 63/0861* (2013.01)
(58) Field of Classification Search
    CPC ....... H04L 63/08; H04L 63/10; H04L 63/20; H04L 63/0428
    See application file for complete search history.

(56) References Cited

U.S. PATENT DOCUMENTS

| | | | |
|---|---|---|---|
| 7,120,607 B2 | 10/2006 | Bolle et al. | |
| 7,773,779 B2 | 8/2010 | Shalev et al. | |
| 7,877,611 B2 | 1/2011 | Camacho et al. | |
| 7,908,645 B2 | 3/2011 | Varghese et al. | |
| 8,108,321 B2 | 1/2012 | Neal et al. | |
| 8,185,936 B1 * | 5/2012 | Reeves et al. | 726/5 |
| 8,219,094 B2 | 7/2012 | Huber et al. | |
| 8,254,368 B2 | 8/2012 | Huber et al. | |
| 8,274,958 B2 | 9/2012 | Huber et al. | |
| 8,275,356 B2 | 9/2012 | Hickie | |
| 8,387,122 B2 | 2/2013 | Toomim et al. | |
| 8,533,485 B1 * | 9/2013 | Bansal et al. | 713/186 |
| 8,554,912 B1 * | 10/2013 | Reeves et al. | 709/225 |
| 8,666,841 B1 * | 3/2014 | Claridge et al. | 705/26.35 |
| 8,843,399 B1 * | 9/2014 | Eakin et al. | 705/26.35 |
| 2003/0074568 A1 * | 4/2003 | Kinsella et al. | 713/186 |
| 2003/0154406 A1 * | 8/2003 | Honarvar et al. | 713/201 |
| 2004/0148526 A1 * | 7/2004 | Sands et al. | 713/202 |
| 2004/0177097 A1 * | 9/2004 | Yu et al. | 707/104.1 |
| 2007/0061590 A1 * | 3/2007 | Boye et al. | 713/186 |
| 2007/0100701 A1 | 5/2007 | Boccon-Gibod et al. | |
| 2009/0077383 A1 | 3/2009 | de Monseignat et al. | |
| 2009/0254572 A1 | 10/2009 | Redlich et al. | |
| 2010/0315201 A1 * | 12/2010 | Hirata et al. | 340/5.82 |
| 2011/0088078 A1 * | 4/2011 | Kholaif et al. | 726/3 |

(Continued)

*Primary Examiner* — Mahfuzur Rahman
*Assistant Examiner* — Carlos Amorin
(74) *Attorney, Agent, or Firm* — BainwoodHuang (57) ABSTRACT

A technique provides malicious identity profiles. The technique involves storing unsuccessful authentication entries in a database, the unsuccessful authentication entries including (i) descriptions of failed attempts to authenticate users and (ii) biometric records captured from the users during the failed attempts to authenticate the users. The technique further involves generating a set of malicious identity profiles based on the descriptions and the biometric records of the unsuccessful authentication entries stored in the database. Each malicious identity profile includes a profile biometric record for comparison with new biometric records during new authentication attempts. The technique further involves outputting the set of malicious identity profiles. Such a set of malicious identity profiles is well suited for use in future authentication operations, i.e., well suited for predicting intruder attacks and fraud attempts, and for sharing risky identities among authentication systems (e.g., among different security products within a cybercrime detection network).

19 Claims, 5 Drawing Sheets

(56) References Cited

U.S. PATENT DOCUMENTS

| | | |
|---|---|---|
| 2011/0113210 A1 | 5/2011 | Klapman et al. |
| 2011/0221567 A1* | 9/2011 | Lehnert et al. ............. 340/5.82 |
| 2011/0320355 A1 | 12/2011 | Pasha et al. |
| 2012/0032945 A1 | 2/2012 | Dare et al. |
| 2012/0036442 A1 | 2/2012 | Dare et al. |
| 2012/0036552 A1 | 2/2012 | Dare et al. |
| 2012/0289246 A1 | 11/2012 | Huber et al. |
| 2013/0227651 A1* | 8/2013 | Schultz et al. .................... 726/4 |
| 2014/0007223 A1* | 1/2014 | Han et al. ........................ 726/16 |
| 2014/0223555 A1* | 8/2014 | Sanz Hernando et al. ..... 726/22 |
| 2014/0230032 A1* | 8/2014 | Duncan ............................. 726/7 |
| 2014/0230033 A1* | 8/2014 | Duncan ............................. 726/7 |
| 2014/0344927 A1* | 11/2014 | Turgeman et al. ............. 726/22 |

\* cited by examiner

PROVIDING MALICIOUS IDENTITY PROFILES FROM FAILED AUTHENTICATION ATTEMPTS INVOLVING BIOMETRICS

BACKGROUND

Biometric authentication typically involves a comparison between a current biometric reading from a person attempting to authenticate and an expected biometric reading of the legitimate user. If these biometric readings do not closely match, authentication is considered unsuccessful and some follow-on or remedial activity usually takes place, e.g., a retry of authentication, step-up authentication, outputting an alert, and so on.

Some biometric authentication operations may involve a comparison of a current biometric reading to a blacklist of biometric readings. If the current biometric reading closely matches one of the biometric readings on the blacklist, authentication is considered unsuccessful or is deemed to be of higher risk thus warranting further scrutiny or action.

To create a blacklist of biometric readings, customers of an authentication service may combine biometric readings known to be fraudulent. For example, suppose that a fraudster successfully authenticates and completes a fraudulent transaction using a particular biometric reading. Once a customer discovers the fraudulent transaction, the customer may add that particular biometric reading to the blacklist. This blacklist is shared with other customers of the authentication service so that any further attempts to use the particular biometric reading among any of the customers results in unsuccessful authentication or further scrutiny/action.

SUMMARY

Unfortunately, there are deficiencies to the above-described conventional approach to creating a blacklist from biometric readings known to be fraudulent. For example, the above-described conventional approach requires explicit fraud feedback, i.e., sharing of the particular biometric reading used in the fraudulent transaction with others. If customers do not share biometric readings from fraudulent transactions, the blacklist is not created or updated. Since customers may be reluctant to share biometric readings from fraudulent transactions or find that sharing such readings is overly burdensome, conventional blacklists of biometric readings are often static and outdated. Additionally, even if customers routinely update blacklists with biometric readings from fraudulent transactions, such blacklists consist only of biometric readings that have been manually confirmed to be fraudulent, i.e., biometric readings that resulted in successful authentications to complete fraudulent transactions.

In contrast to the above-described conventional approach to creating a blacklist from biometric readings known to be fraudulent, improved techniques are directed to providing malicious identity profiles (e.g., in the form of a blacklist) from failed authentication attempts involving biometrics. Such profiles improve security when used in future authentication operations. Along these lines, data from failed biometric attempts is collected over time and used to create the malicious identity profiles. Accordingly, the authentication process is capable of learning fraudulent (or intruder) behaviors without receiving any other type of explicit fraud feedback. Rather, the authentication process is able to receive dynamic malicious identity profiles without any labeled fraud data. Such malicious identity profiles may be circulated among a variety of authentication servers, e.g., subscribing members of an anti-fraud network, and used in different types of authentication such as standard authentication, multi-factor authentication, adaptive (or risk-based) authentication, etc. Moreover, such malicious identity profiles may be assigned scores (e.g., via machine learning analytics) and such scores may be used as input risk scores (or weights) in adaptive authentication operations which output aggregate risk scores indicating overall assessed risks of particular transactions.

One embodiment is directed to a method of providing malicious identity profiles. The method includes storing, by processing circuitry, unsuccessful authentication entries in a database, the unsuccessful authentication entries including (i) descriptions of failed attempts to authenticate users and (ii) biometric records captured from the users during the failed attempts to authenticate the users. The method further includes generating, by the processing circuitry, a set of malicious identity profiles based on the descriptions and the biometric records of the unsuccessful authentication entries stored in the database. Each malicious identity profile includes a profile biometric record for comparison with new biometric records during new authentication attempts. The method further includes outputting, by the processing circuitry, the set of malicious identity profiles. Such a set of malicious identity profiles is well suited for use in future authentication operations, i.e., well suited for predicting intruder attacks and fraud attempts, and for sharing risky identities among authentication systems (e.g., among different security products within a cybercrime detection network).

In some arrangements, generation of the set of malicious identity profiles involves performing comparison operations on the descriptions and the biometric records of the unsuccessful authentication entries to group at least some of the unsuccessful authentication entries into sets of similar unsuccessful authentication entries. Each set of similar unsuccessful authentication entries includes multiple unsuccessful authentication entries which are alike based on a set of similarity scores resulting from the comparison operations (e.g., via pair-wise similarity scores).

In some arrangements, the set of malicious identity profiles is then formed from at least some of the sets of similar unsuccessful authentication entries. In these arrangements, suspicion profiles are created from the sets of similar unsuccessful authentication entries. Historical data from the database is then collected for each created suspicion profile. Such historical data may include, among other things, for each suspicion profile created:

(i) a total of the number of times a biometric record matching, within a set of predefined thresholds, the particular profile biometric record of that suspicion profile appears in the database, (ii) a total of the number of user accounts contributing the particular set of similar unsuccessful authentication entries of that suspicion profile, (iii) a total number of failed authentication attempts, (iv) a total number of successful authentication attempts, and (v) timestamp information for the particular set of similar unsuccessful authentication entries (e.g., time of day, day of the week, etc.).

In some arrangements, forming the set of malicious identity profiles further includes performing risk-based analytics operations on the suspicion profiles based on the historical data to generate suspicion scores for the suspicion profiles, and assigning the suspicion scores to the suspicion profiles. Each suspicion profile is assigned a respective suspicion score, and the set of malicious identity profiles is based on a ranking of the suspicion scores assigned to the suspicion profiles. Such operation may include processing the historical data through a machine learning circuit which is constructed and arranged to identify suspicion profiles that have high correlation to failures and fraudulent patterns.

In some arrangements, the method further includes distributing, as the set of malicious identity profiles, suspicion profiles and suspicion scores assigned to the suspicion profiles to a set of authentication servers through a computerized network (e.g., Fraud networks, cybercrime networks, central ecosystems, etc.). In certain arrangements, each authentication server is constructed and arranged to perform multi-factor authentication which includes biometric authentication as an authentication factor. In other arrangements, each adaptive-authentication server is constructed and arranged to perform adaptive-authentication which includes biometric authentication as an adaptive-authentication factor. In yet other arrangements, some authentication servers perform standard (or multi-factor) authentication and other authentication servers perform adaptive-authentication.

It should be understood that, in the cloud context, at least some of the processing circuitry is formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in providing malicious identity profiles.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to providing malicious identity profiles (e.g., providing a blacklist) from failed authentication attempts involving biometrics. Such profiles are well suited for improving security when used in future authentication operations. Along these lines, data from failed biometric attempts is collected over time and used to create the malicious identity profiles. As a result, the authentication process is capable of learning fraudulent (or intruder) behaviors without receiving any other type of explicit fraud feedback. That is, the authentication process is able to receive dynamic malicious identity profiles without any labeled fraud data. Such malicious identity profiles may be circulated among a variety of authentication servers (e.g., subscribing members of an anti-fraud network) and used in different types of authentication such as standard authentication, multi-factor authentication, adaptive (or risk-based) authentication, etc. Furthermore, such malicious identity profiles may be assigned scores (e.g., via machine learning analytics) and such scores may be used as input risk scores (or weights) in adaptive authentication operations which output aggregate risk scores indicating overall assessed risks of particular transactions.

Figure 1:
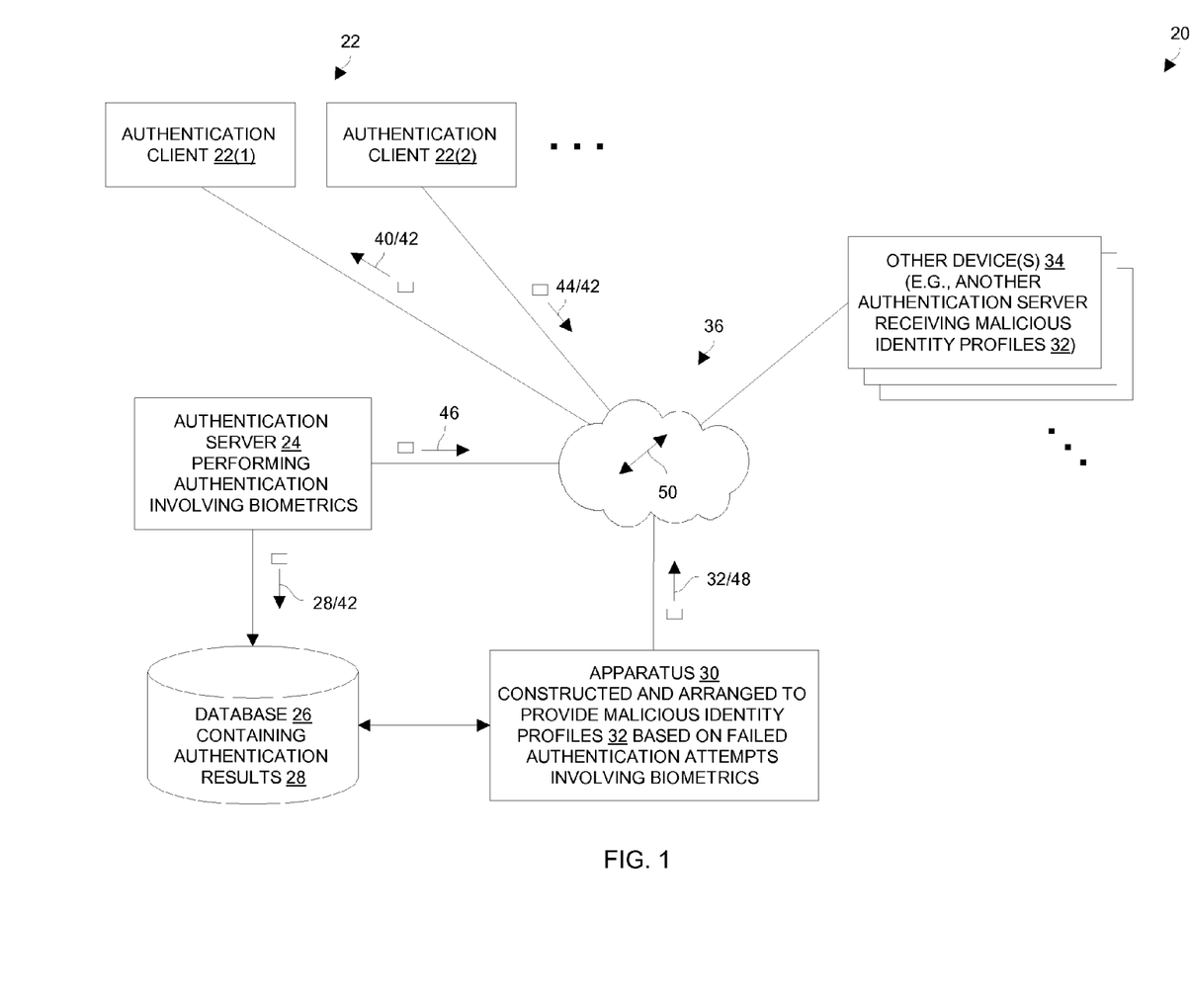
FIG. 1 is a block diagram of an electronic environment which enjoys enhanced security via creation and use of malicious identity profiles from failed authentication attempts involving biometrics.

FIG. 1 shows an electronic environment 20 which enjoys enhanced security via creation and use of malicious identity profiles from failed authentication attempts involving biometrics. The electronic environment 20 includes authentication clients 22(1), 22(2), . . . (collectively, authentication clients 22), an authentication server 24, a database 26 which stores authentication results 28, a specialized apparatus 30 to provide malicious identity profiles 32, one or more other device(s) 34, and communications medium 36.

The authentication clients 22 are constructed and arranged to control access to protected resources. As will be explained in further detail shortly, each authentication client 22 receives resource access requests 40 containing biometric records 42 from users (e.g., account login attempts, transaction verification/confirmation attempts, etc.), and then communicates with the authentication server 24 to authenticate the users using the biometric records 42 perhaps in combination with other information (e.g., a user ID, a password and/or PIN, a one-time passcode, etc.). Examples of suitable biometric records 42 include facial scans, voice prints, fingerprints, eye (iris/retina) scans, keystroke data, and handwriting analysis, among others. Examples of suitable authentication clients 22 include online stores, online banks/brokerages, file servers, VPN servers, building security systems, and so on The authentication server 24 is constructed and arranged to receive authentication requests 44 containing the biometric records 42 from the authentication clients 22, and perform authentication operations in response to the authentication requests 44 in order to authenticate the users. The authentication server 24 provides authentication responses 46 indicating whether authentication was successful back to the authentication clients 22. Additionally, the authentication server 24 stores the authentication results 28 including the biometric records 42 of failed authentication attempts in the database 26.

The specialized apparatus 30 is constructed and arranged to generate malicious identity profiles 32 from the authentication results 28 stored in the database 26. As will be explained in further detail shortly, the malicious identity profiles 32 are based on an evaluation of failed attempts to authenticate the users and the biometric records 42 captured from the users during the failed attempts (see the authentication request 40 containing a biometric record 42). The specialized apparatus 30 then outputs the malicious identity profiles 32 for use in subsequent user authentication (e.g., sending the malicious identity profiles 32 to the authentication server 24 in a feedback manner, storing the malicious identity profiles 32 in the database 26, distributing the malicious identity profiles 32 to other authentication servers such as the other devices 34, and so on). In some arrangements, the specialized apparatus 30 assigns suspicion scores 48 (e.g., a score or weight derived from machine learning based on risk analytics) to the malicious identity profiles 32 to enhance the use of the malicious identity profiles 32 (e.g., for use in adaptive authentication).

The other devices 34 represent other components of the electronic environment 20 such as members/subscribers of an anti-fraud network which receives the malicious identity profiles 32 from the specialized apparatus 30 and utilizes the malicious identity profiles 32 as a blacklist to protect access to resources. In some arrangements, multiple authentication servers share their authentication results for use in generating the malicious identity profiles 32. It should be understood that all types of validation which involve biometric authentication results are suitable for use (e.g., pass/fail, continuous score compared to threshold, etc.).

The communications medium 36 is constructed and arranged to connect the various components of the electronic environment 20 together to enable these components to exchange electronic signals 50 (e.g., see the double arrow 50). At least a portion of the communications medium 36 is illustrated as a cloud to indicate that the communications medium 36 is capable of having a variety of different topologies including backbone, hub-and-spoke, loop, irregular, combinations thereof, and so on. Along these lines, the communications medium 36 may include copper-based data communications devices and cabling, fiber optic devices and cabling, wireless devices, combinations thereof, etc. Furthermore, the communications medium 36 is capable of supporting LAN-based communications, SAN-based communications, cellular communications, combinations thereof, etc.

It should be understood that the database 26 was shown in FIG. 1 as being separate from the authentication server 24 and the specialized apparatus 30 by way of example only. In some arrangements, the database 26 is more tightly integrated with the authentication server 24 (e.g., co-located with or forms part of the authentication server 24). In other arrangements, the database 26 is more tightly integrated with the specialized apparatus 30 (e.g., co-located with or forms part of the specialized apparatus 30). In yet other arrangements, the authentication server 24 and the specialized apparatus 30 are formed by the same hardware. Along these lines, the hardware may continuously operate as the authentication server 24 but periodically operates (perhaps in an offline process) as the specialized apparatus 30 (e.g., nightly, weekly, monthly, etc.) to generate the malicious identity profiles 32.

In some arrangements, the database 26 includes multiple smaller databases (e.g., local databases containing authentication results 28 for local authentication servers). In some arrangements, the database 26 stores authentication results 28 including the biometric records 42 of successful authentication attempts as well. Further details will now be provided with reference to FIGS. 2 and 3.

Figure 2:
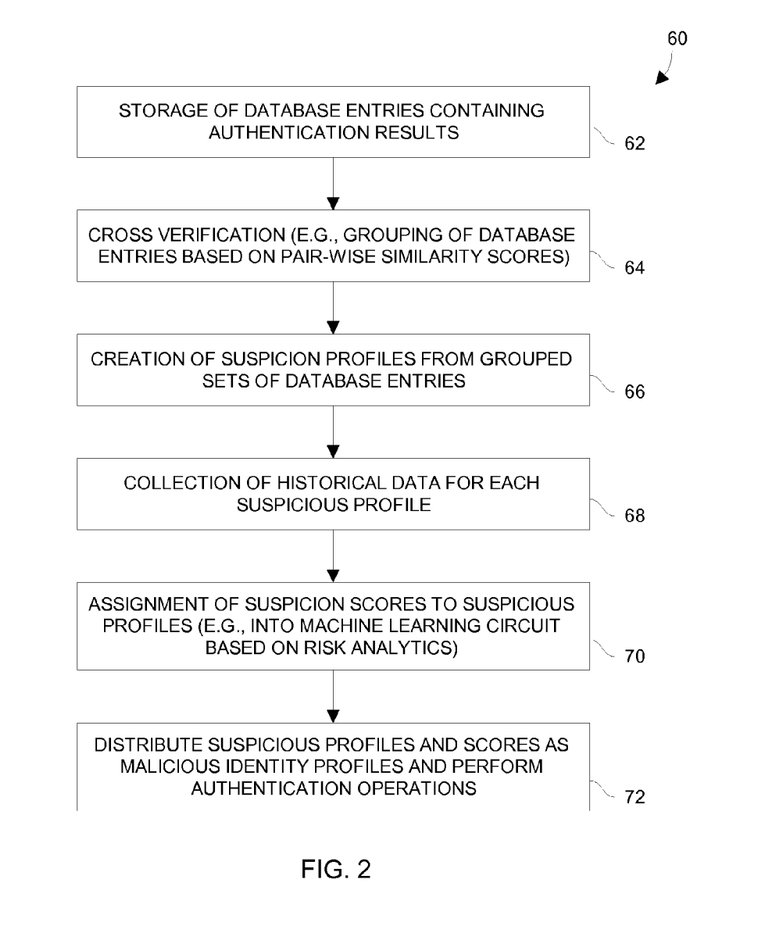
FIG. 2 is a block diagram of particular steps of a process suitable for creating, distributing and using the malicious identity profiles.
Figure 3:
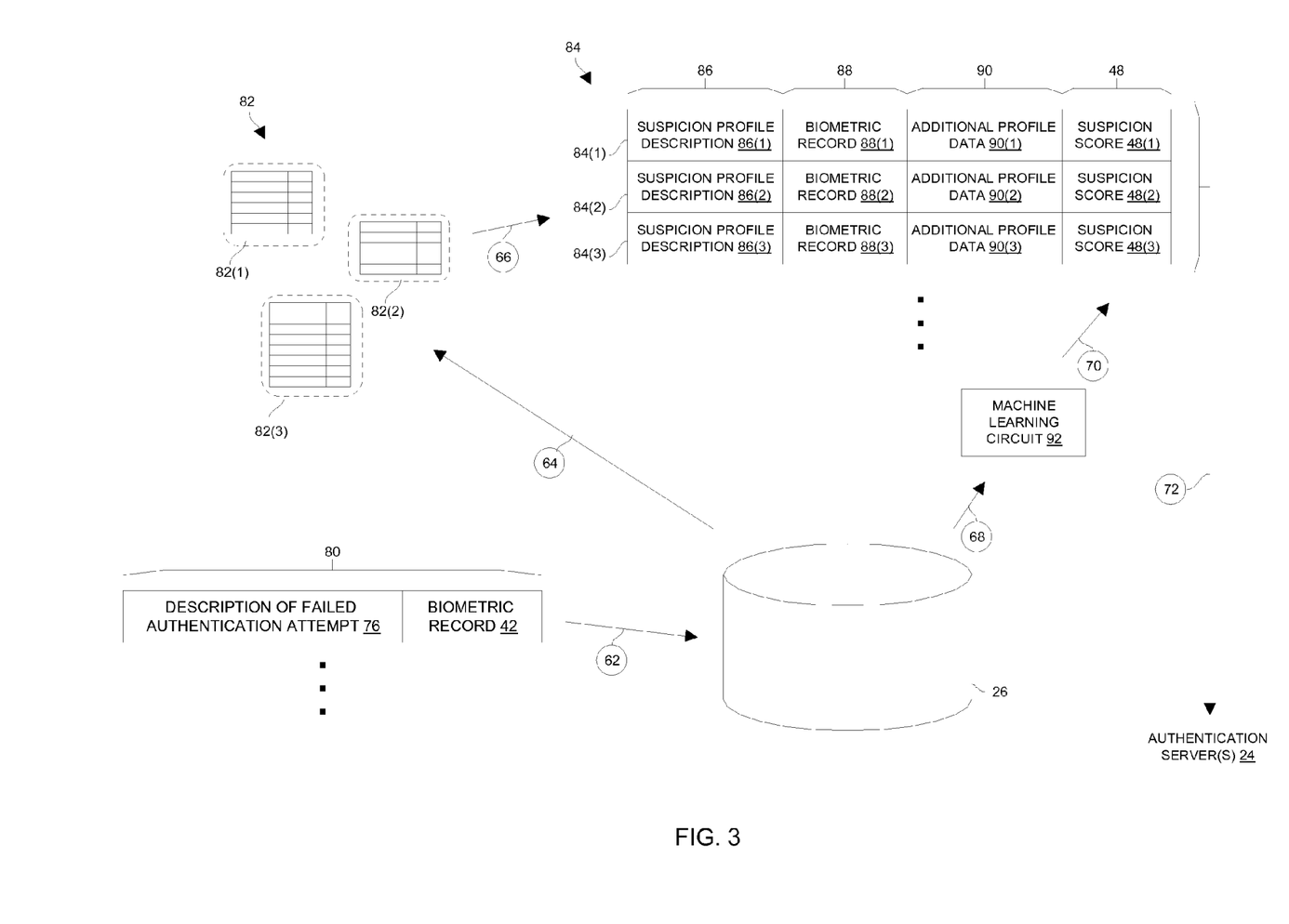
FIG. 3 is a block diagram of particular details of a portion of the process of FIG. 2.

FIGS. 2 and 3 illustrate a process 60 for creating, distributing and using the malicious identity profiles 32 of FIG. 1. FIG. 2 is a block diagram of particular phases of the process 60. FIG. 3 is a diagram illustrating the relationships of particular data involved in the process 60.

As best seen in FIG. 2, the phases of the process 60 are organized in a pipelined manner. The process 60 includes a storage phase 62, a cross verification phase 64, a profile creation phase 66, a historical data collection phase 68, a score assignment phase 70, and a distribution and usage phase 72.

In the storage phase 62, the authentication server 24 stores unsuccessful authentication entries 80 in the database 26 (illustrated by the arrow 62 in FIG. 3). Recall that users send access requests 40 containing biometric records 42 to the authentication clients 22 in order to access protected resources (also see FIG. 1). In turn, the authentication clients 22 send authentication requests 44 containing the biometric records 42 to the authentication server 24. Some authentication requests 44 ultimately result in unsuccessful authentication causing unsuccessful authentication entries 80 to be stored in the database 26.

As shown in FIG. 3, each unsuccessful authentication entry 80 includes a description portion 76 and a biometric record portion 42. The description portion 76 includes information regarding the failed attempt such as identification information provided during the unsuccessful authentication attempt (e.g., a user identifier, a user password/PIN, a timestamp, etc.). The biometric record portion 42 includes information which forms a captured biometric record (e.g., a biometric scan, biometric measurements, etc.). It should be understood that this information may vary depending on the particular type of biometric method (e.g., distance and geometry measurements for a facial scan, typing speed for a keystroke biometric, a copy fingerprint for a fingerprint biometric, and so on).

In the cross verification phase 64, the specialized apparatus 30 (FIG. 1) performs comparison operations on the unsuccessful authentication entries 80 stored in the database 26 to group (or cluster) at least some of the unsuccessful authentication entries 80 into sets 82 of similar unsuccessful authentication entries 80 (illustrated by the arrow 64 in FIG. 3). Each set 82 of similar unsuccessful authentication entries 80 includes multiple unsuccessful authentication entries 80 which are alike due to relative differences (i.e., distances) in the data.

In some arrangements, the specialized apparatus 30 uses biometric verification engines to perform cross verification operations over all of the biometric records of the unsuccessful authentication entries 80. In these arrangements, the biometric verification engines calculate pair-wise similarity scores between all of the biometric records of the failed authentication entries 80 and group the failed authentication entries 80 into their sets 82.

In the profile creation phase 66, the specialized apparatus 30 creates respective suspicious profiles 84(1), 84(2), 84(3), . . . from the sets 82(1), 82(2), 82(3), . . . of similar unsuccessful authentication entries 80 (illustrated by the arrow 66 in FIG. 3). Along these lines, biometric records having high scores (or similar patterns) are saved together as part of the suspicious profiles 84 in the database 26. In some arrangements, the biometric methods report each authentication result with a confidence level. In these arrangements, only the unsuccessful authentication entries 80 having high confidence levels may be used to reduce false positives.

In some arrangements, each suspicious profile 84 includes a description portion 86, a biometric record portion 88 which stores a profile biometric record, and an additional profile data portion 90. The description portion 86 of each suspicious profile 84 stores suspicious profile description data (e.g., a suitable authentication type such as multi-factor or adaptive authentication, the type of biometric, and so on). The biometric record portion 88 stores the profile biometric record (e.g., a common or composite biometric scan, an averaging of biometric measurements, etc.). The additional profile data portion 90 includes support information such as the time of creation of the profile 84, an identifier of the apparatus 30 that created the profile 84, and so on.

In the historical data collection phase 68 (illustrated by the arrow 68 in FIG. 3), the specialized apparatus 30 gathers historical information from the database 26. In particular, the specialized apparatus 30 tabulates, for each suspicious profile 84, historical data such as the number of times the same biometric record appears in the database 68 (e.g., within a well-defined period of operation), the number of accounts/users having the same biometric record, the number of failed authentication attempts, the number of successful authentication attempts, the number of confirmed fraud markings, times of day of the authentication attempts, days of the week of the authentication attempts, etc.

In the score assignment phase 70, the specialized apparatus 30 inputs the extracted historical data into a machine learning circuit 92 which is provisioned with risk-based analytics. The machine learning circuit 92 identifies the suspicious profiles 84 that have high correlation to failures and fraudulent patterns. As a result, the top ranked X suspicious profiles 84 (X being a positive integer) are deemed to be the malicious identity profiles 84 which are further used in subsequent authentication operations (e.g., the top 100, the top 500, the top 1000, etc.). In some arrangements, all of the suspicious profiles 84 are subsequently used as the malicious identity profiles 84.

In some arrangements, the machine learning circuit 92 generates and assigns a respective suspicion score 48 to each profile 84 (illustrated by the arrow 70 in FIG. 3). Each suspicion score 48 is based on the pass/failure rate of biometric authentication, the similarity and confidence scores from the biometric verification engine, the received feedback of fraudulent behaviors, confidence weights of different biometric solutions, and so on.

It should be appreciated that the machine learning engine 92 is able to reveal a variety of fraudulent patterns. For example, if a suspicious profile 84 has high correlation to multiple authentication failures and a low correlation of successful authentication in a specific time frame (the same hour, day, week, month, year, etc.) then it might indicate that the same identity continuously attempts to verify as another person's identity. As another example, if a suspicious profile 84 has a high frequency of authentication attempts during the specific time of the day (or week) and a high correlation to failed authentication then this suspicious profile 84 might be identified as highly malicious. As yet another example, if the suspicious profile 84 is correlated to a change in behavior (as frequency of logins, times/days of logins, applications accessed, etc.) then this suspicious profile 84 might be identified as highly malicious.

In the distribution and usage phase 72, the malicious profiles 84 are provided to one or more authentication servers 24 for use in further authentication operations. For example, the malicious profiles 84 may be fed back to the authentication server 24 that was the source of the unsuccessful authentication entries 80 thus forming a feedback loop. As another example, the malicious identity profiles 84 may be distributed to multiple authentication servers, i.e., shared over central fraud networks and ecosystems for proactive malicious behavior control.

In some arrangements, the malicious identity profiles 84 are added to a previously provided list of malicious identity profiles 84, i.e., to update the previous list. In other arrangements, the malicious identity profiles 84 are merged with similar malicious identity profiles 84 generated in parallel from one or more other generation systems, i.e., by contributing members of an anti-fraud network.

In some arrangements, the suspicion scores 48 are further used in adaptive authentication. In these arrangements, when an adaptive authentication engine is ready to perform an adaptive authentication operation in response to an authentication request 44 containing a biometric record 42 (also see FIG. 1), the adaptive authentication engine first verifies the biometric record 42 provided by a user attempting to authenticate with the profile biometric records 88 of the malicious identity profiles 84 (FIG. 3). If the current biometric record 42 matches one of the profile biometric records 88 of the malicious identity profiles 84 (e.g., within a set of predefined thresholds or closeness criteria), the suspicion score 48 assigned to the matching malicious identity profile 84 is incorporated into the overall risk score of the adaptive authentication operation. In some arrangements, the suspicion score 48 is simply added in a raw manner or treated in a weighted manner or as a weight itself. Further details will now be provided with reference to FIG. 4.

Figure 4:
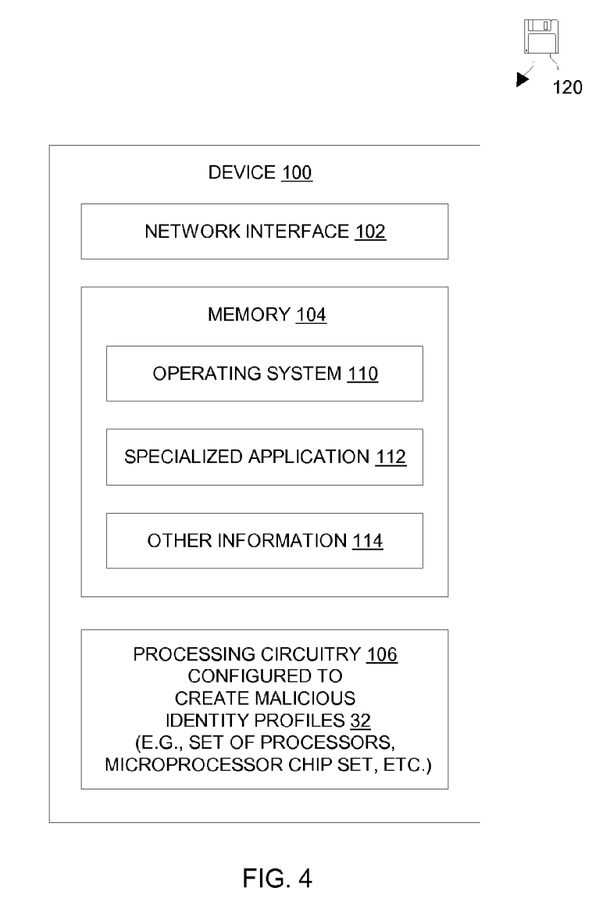
FIG. 4 is a block diagram of particular details of another portion of the process of FIG. 2.

FIG. 4 shows details of a device 100 which is suitable for use as the specialized apparatus 30. The device 100 includes a network interface 102, memory 104, and processing circuitry 106.

The network interface 102 is constructed and arranged to connect the device 100 to the communications medium 36 (FIG. 1). Accordingly, the network interface 102 enables the device 100 to communicate with the other components of the electronic environment 20 (FIG. 1).

The memory 104 is intended to represent both volatile storage (e.g., DRAM, SRAM, etc.) and non-volatile storage (e.g., flash memory, magnetic disk drives, etc.). The memory 104 stores a variety of software constructs including an operating system 110, a specialized application 112, and other information 114.

The processing circuitry 106 is constructed and arranged to operate in accordance with the various software constructs stored in the memory 104. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 120 is capable of delivering all or portions of the software to the device 100. The computer program product 120 has a non-transitory (or non-volatile) computer readable medium which stores a set of instructions which controls one or more operations of the device 100. Examples of suitable computer readable storage media include tangible articles of manufacture and apparatus which store instructions in a non-volatile manner such as CD-ROM, flash memory, disk memory, tape memory, and the like.

During operation, the processing circuitry 106 executes the operating system 110 in order to manage particular computerized resources of the device 100 such as memory allocation and processor cycles. Additionally, the processing circuitry 106 executes the specialized application 112 to perform one or more of the phases of the process 60 illustrated in FIGS. 2 and 3.

In some arrangements, the device 100 further operates as an authentication server to perform authentication operations. In these arrangements, the other information 114 may represent particular data of the process 60 such as the database 26, the grouped database entries 80, the suspicion profiles 84, the suspicion scores 48, and so on.

In some arrangements, the processing circuitry 106 further forms the machine learning circuit (or engine) 92 (also see FIG. 3). In these arrangements, the other information 114 may further represent particular risk-based analytics, algorithms, etc. which are involved in machine learning and generating scores (e.g., confidence weights, similarity scores, suspicion scores 48, etc.). Further details will now be provided with reference to FIG. 5.

Figure 5:
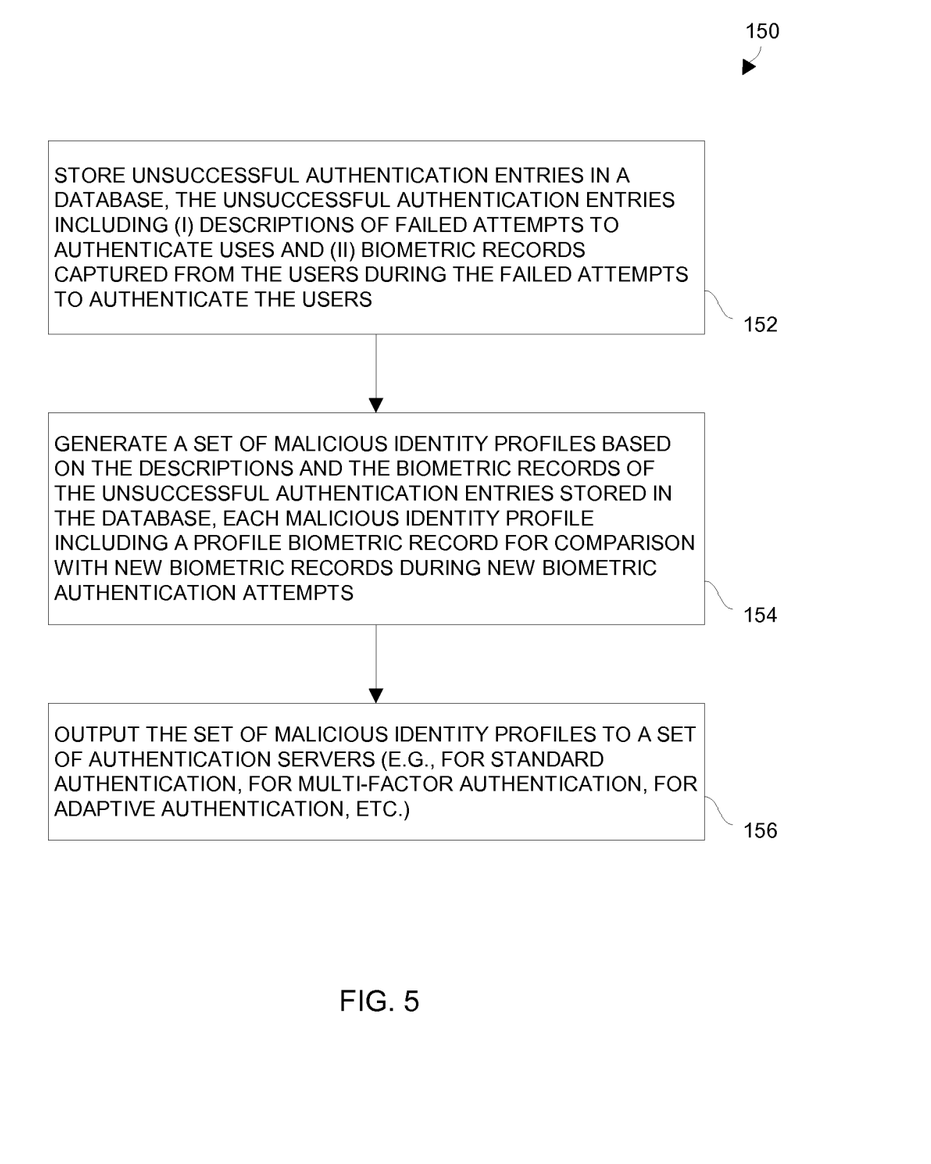
FIG. 5 is a flowchart of a procedure which is performed by the electronic environment of FIG. 1.

FIG. 5 is a flowchart of a procedure 150 which is performed within the electronic environment 20 of FIG. 1 to provide malicious identity profiles 84. In step 152, the specialized apparatus 30 stores unsuccessful authentication entries 80 in the database 26. Alternatively, one or more authentication servers 24 store the unsuccessful authentication entries 80 in the database 26. As mentioned earlier in connection with FIGS. 2 and 3, the unsuccessful authentication entries 80 includes (i) descriptions 76 of failed attempts to authenticate users and (ii) biometric records 42 captured from the users during the failed attempts to authenticate the users.

In step 152, the specialized apparatus 30 generates a set of malicious identity profiles 84 based on the descriptions 76 and the biometric records 42 of the unsuccessful authentication entries 80 stored in the database 26. Each malicious identity profile 84 includes a profile biometric record 88 for comparison with new biometric records during new authentication attempts.

In step 154, the specialized apparatus 30 outputs the set of malicious identity profiles 84 to a set of authentication servers for use in subsequent authentication operations. It should be understood that the procedure 150 is capable of being repeated in an ongoing manner (e.g., nightly, weekly, etc.). As a result, authentication servers are able to be updated with new fraudster/intruder profiles, with a risk score attached, in an adaptive manner.

As described above, improved techniques are directed to providing malicious identity profiles 84 (e.g., in the form of a blacklist) from failed authentication attempts involving biometrics. Such profiles 84 improve security when used in future authentication operations. Along these lines, data from failed biometric attempts is collected over time and used to create the malicious identity profiles 84. Accordingly, the authentication process is capable of learning fraudulent (or intruder) behaviors without receiving any other type of explicit fraud feedback. Rather, the authentication process is able to receive dynamic malicious identity profiles without any labeled fraud data. Such malicious identity profiles 84 may be circulated among a variety of authentication servers, e.g., subscribing members of an anti-fraud network, and used in different types of authentication such as standard authentication, multi-factor authentication, adaptive (or risk-based) authentication, etc. Moreover, such malicious identity profiles 84 may be assigned suspicion scores 48 (e.g., via machine learning analytics) and such scores 48 may be used as input risk scores (or weights) in adaptive authentication operations which output aggregate risk scores indicating overall assessed risks of particular transactions.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

One will appreciate that the above-described techniques provide the ability to predict and share risky identities by using the biometric data and its behaviors in authentication process. Such techniques may be used in risk-based adaptive authentication systems and as well in any kind of cybercrime detection systems for predicting the intruder attacks. Once a list of suspicious profiles 84 is in hand, it can serve as a feed of malicious biometric records 88 that can be shared and consumed by different products (for example like central ecosystems, cybercrime networks and fraud networks).

Moreover, the above-described techniques enable security products to learn fraudulent/intruder behaviors without receiving any explicit fraud feedback (only authentication results). That is, such techniques enable dynamic creation of malicious biometric profile lists without any labeled fraud data, and assignment of a continuous risk score to each suspicions profile 84. The lists add another verification layer to biometric authentication flow. Such modifications and enhancements are intended to belong to various embodiments of the disclosure.

What is claimed is:

1. A method of providing malicious identity profiles, the method comprising:
   storing, by processing circuitry, unsuccessful authentication entries in a database, the unsuccessful authentication entries including (i) descriptions of failed attempts to authenticate users and (ii) biometric records captured from the users during the failed attempts to authenticate the users;
   generating, by the processing circuitry, a set of malicious identity profiles based on the descriptions and the biometric records of the unsuccessful authentication entries stored in the database, each malicious identity profile including a profile biometric record for comparison with new biometric records during new authentication attempts; and
   outputting, by the processing circuitry, the set of malicious identity profiles;
   wherein generating the set of malicious identity profiles includes:
     performing comparison operations on the descriptions and the biometric records of the unsuccessful authentication entries to group at least some of the unsuccessful authentication entries into sets of similar unsuccessful authentication entries, each set of similar unsuccessful authentication entries including multiple unsuccessful authentication entries which are alike based on a set of similarity scores resulting from the comparison operations, and
     forming the set of malicious identity profiles from at least some of the sets of similar unsuccessful authentication entries;
   wherein forming the set of malicious identity profiles from at least some of the sets of similar unsuccessful authentication entries includes:
     creating suspicion profiles from the sets of similar unsuccessful authentication entries, each suspicion profile including a particular profile biometric record created from a particular set of similar unsuccessful authentication entries, and collecting historical data from the database for each created suspicion profile; and wherein the method further comprises:

distributing, as the set of malicious identity profiles, the suspicion profiles and suspicion scores which are assigned to the suspicion profiles to a set of adaptive-authentication servers through a computerized network, each adaptive-authentication server being constructed and arranged to perform adaptive-authentication (i) which includes biometric authentication as an adaptive-authentication factor and (ii) which is based on the malicious identity profiles.

2. A method as in claim 1 wherein collecting the historical data from the database for each created suspicion profile includes:

for each suspicion profile created, tabulating:
(i) a total of the number of times a biometric record matching, within a set of predefined thresholds, the particular profile biometric record of that suspicion profile appears in the database,
(ii) a total of the number of user accounts contributing the particular set of similar unsuccessful authentication entries of that suspicion profile,
(iii) a total number of failed authentication attempts,
(iv) a total number of successful authentication attempts, and
(v) timestamp information for the particular set of similar unsuccessful authentication entries.

3. A method as in claim 1 wherein forming the set of malicious identity profiles further includes:

performing risk-based analytics operations on the suspicion profiles based on the historical data to generate the suspicion scores for the suspicion profiles, and assigning the suspicion scores to the suspicion profiles, each suspicion profile being assigned a respective suspicion score, the set of malicious identity profiles being based on a ranking of the suspicion scores assigned to the suspicion profiles.

4. A method as in claim 3 wherein performing the risk-based analytics operations on the suspicion profiles includes:

processing the historical data collected from the database through a machine learning circuit which is constructed and arranged to identify suspicion profiles based on correlation to successful authentication and unsuccessful authentication within a predefined time frame.

5. A method as in claim 3 wherein X is a number of malicious identity profiles in the set of malicious identity profiles; and wherein forming the set of malicious identity profiles further includes:

selecting, as the set of malicious identity profiles, the suspicion profiles assigned a highest X suspicion scores.

6. A method as in claim 3, further comprising:

distributing, as at least some of the set of malicious identity profiles, the suspicion profiles and suspicion scores assigned to the suspicion profiles to a set of other authentication servers through the computerized network, each of the other authentication servers being constructed and arranged to perform multi-factor authentication which includes biometric authentication as an authentication factor.

7. A method as in claim 1, further comprising:

in response to a new authentication request, comparing a new biometric record captured from a user of the new authentication request to a biometric record of each suspicion profile, in response to a match detected between the new biometric record and the biometric record of a particular suspicion profile, including the suspicion score assigned to the particular suspicion profile in an adaptive authentication operation which generates an aggregate risk score indicating a level of riskiness for the new authentication request, and in response to no match detected between the new biometric record and the biometric record of a particular suspicion profile, not including the suspicion score assigned to any particular suspicion profile in the adaptive authentication operation which generates the aggregate risk score indicating the level of riskiness for the new authentication request.

8. A method as in claim 1 wherein storing the unsuccessful authentication entries in the database includes:

using circuitry to capture distance and geometry measurements for a facial scan, and storing the distance and geometry measurements electronically as biometric record data in the database.

9. A method as in claim 1 wherein storing the unsuccessful authentication entries in the database includes:

using circuitry to capture a typing speed measurement for a keystroke biometric, and storing the typing speed measurement electronically as biometric record data in the database.

10. A method as in claim 1 wherein storing the unsuccessful authentication entries in the database includes:

using circuitry to make an electronic fingerprint copy for a fingerprint biometric, and storing the electronic fingerprint copy as biometric record data in the database.

11. A method as in claim 1, further comprising:

performing a cybercrime detection operation using the set of malicious identity profiles to identify a cybercrime event.

12. A method as in claim 11 wherein the cybercrime event is an attempt to complete a fraudulent transaction.

13. A method as in claim 11 wherein the cybercrime event is an electronic intruder attack.

14. An electronic apparatus, comprising:

a network interface;

memory; and control circuitry coupled to the network interface and the memory, the memory storing instructions which, when carried out by the control circuitry, cause the control circuitry to:

store unsuccessful authentication entries in a database residing in the memory, the unsuccessful authentication entries including (i) descriptions of failed attempts to authenticate users and (ii) biometric records captured from the users during the failed attempts to authenticate the users, generate a set of malicious identity profiles based on the descriptions and the biometric records of the unsuccessful authentication entries stored in the database, each malicious identity profile including a profile biometric record for comparison with new biometric records during new authentication attempts, and output the set of malicious identity profiles;

wherein the control circuitry, when generating the set of malicious identity profiles, is constructed and arranged to:
    perform comparison operations on the descriptions and the biometric records of the unsuccessful authentication entries to group at least some of the unsuccessful authentication entries into sets of similar unsuccessful authentication entries, each set of similar unsuccessful authentication entries including multiple unsuccessful authentication entries which are alike based on a set of similarity scores resulting from the comparison operations, and
    form the set of malicious identity profiles from at least some of the sets of similar unsuccessful authentication entries;
wherein the control circuitry, when forming the set of malicious identity profiles from at least some of the sets of similar unsuccessful authentication entries, is constructed and arranged to:
    create suspicion profiles from the sets of similar unsuccessful authentication entries, each suspicion profile including a particular profile biometric record created from a particular set of similar unsuccessful authentication entries, and
    collect historical data from the database for each created suspicion profile; and
wherein the control circuitry is further constructed and arranged to:
    distribute, as the set of malicious identity profiles, the suspicion profiles and suspicion scores which are assigned to the suspicion profiles to a set of adaptive-authentication servers through a computerized network, each adaptive-authentication server being constructed and arranged to perform adaptive-authentication (i) which includes biometric authentication as an adaptive-authentication factor and (ii) which is based on the malicious identity profiles.

15. An electronic apparatus as in claim 14 wherein the control circuitry, when forming the set of malicious identity profiles, is further constructed and arranged to:
    perform risk-based analytics operations on the suspicion profiles based on the historical data to generate the suspicion scores for the suspicion profiles, and
    assign the suspicion scores to the suspicion profiles, each suspicion profile being assigned a respective suspicion score, the set of malicious identity profiles being based on a ranking of the suspicion scores assigned to the suspicion profiles.

16. An electronic apparatus as in claim 15 wherein the control circuitry, when performing the risk-based analytics operations on the suspicion profiles, is constructed and arranged to:
    process the historical data collected from the database through a machine learning circuit which is constructed and arranged to identify suspicion profiles based on correlation to successful authentication and unsuccessful authentication within a predefined time frame.

17. A computer program product having a non-transitory computer readable medium which stores a set of instructions to provide malicious identity profiles, the set of instructions, when carried out by computerized circuitry, causing the computerized circuitry to perform a method of:
    storing, by the computerized circuitry, unsuccessful authentication entries in a database, the unsuccessful authentication entries including (i) descriptions of failed attempts to authenticate users and (ii) biometric records captured from the users during the failed attempts to authenticate the users;
    generating, by the computerized circuitry, a set of malicious identity profiles based on the descriptions and the biometric records of the unsuccessful authentication entries stored in the database, each malicious identity profile including a profile biometric record for comparison with new biometric records during new authentication attempts; and
    outputting, by the computerized circuitry, the set of malicious identity profiles;
wherein generating the set of malicious identity profiles includes:
    performing comparison operations on the descriptions and the biometric records of the unsuccessful authentication entries to group at least some of the unsuccessful authentication entries into sets of similar unsuccessful authentication entries, each set of similar unsuccessful authentication entries including multiple unsuccessful authentication entries which are alike based on a set of similarity scores resulting from the comparison operations, and
    forming the set of malicious identity profiles from at least some of the sets of similar unsuccessful authentication entries;
wherein forming the set of malicious identity profiles from at least some of the sets of similar unsuccessful authentication entries includes:
    creating suspicion profiles from the sets of similar unsuccessful authentication entries, each suspicion profile including a particular profile biometric record created from a particular set of similar unsuccessful authentication entries, and
    collecting historical data from the database for each created suspicion profile; and
wherein the method further comprises:
    distributing, as the set of malicious identity profiles, the suspicion profiles and suspicion scores which are assigned to the suspicion profiles to a set of adaptive-authentication servers through a computerized network, each adaptive-authentication server being constructed and arranged to perform adaptive-authentication (i) which includes biometric authentication as an adaptive-authentication factor and (ii) which is based on the malicious identity profiles.

18. A computer program product as in claim 17 wherein forming the set of malicious identity profiles further includes:
    performing risk-based analytics operations on the suspicion profiles based on the historical data to generate the suspicion scores for the suspicion profiles, and
    assigning the suspicion scores to the suspicion profiles, each suspicion profile being assigned a respective suspicion score, the set of malicious identity profiles being based on a ranking of the suspicion scores assigned to the suspicion profiles.

19. A computer program product as in claim 18 wherein performing the risk-based analytics operations on the suspicion profiles includes:
    processing the historical data collected from the database through a machine learning circuit which is constructed and arranged to identify suspicion profiles based on correlation to successful authentication and unsuccessful authentication within a predefined time frame.

* * * * *